(12) United States Patent
Toshizane et al.

(10) Patent No.: US 10,883,597 B2
(45) Date of Patent: Jan. 5, 2021

(54) VEHICLE CONTROL DEVICE, VEHICLE, AND VEHICLE CONTROL METHOD

(71) Applicant: HONDA MOTOR CO., LTD., Tokyo (JP)

(72) Inventors: Go Toshizane, Wako (JP); Takeshi Kurata, Wako (JP); Satoshi Kanazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/684,201

(22) Filed: Nov. 14, 2019

(65) Prior Publication Data

US 2020/0158237 A1 May 21, 2020

(30) Foreign Application Priority Data

Nov. 16, 2018 (JP) .................................. 2018-215543

(51) Int. Cl.
*F16H 61/12* (2010.01)
*F16H 61/662* (2006.01)
*F16H 59/40* (2006.01)
*F16H 59/42* (2006.01)

(52) U.S. Cl.
CPC ........... *F16H 61/12* (2013.01); *F16H 61/662* (2013.01); *F16H 59/40* (2013.01); *F16H 59/42* (2013.01); *F16H 2061/124* (2013.01); *F16H 2061/1284* (2013.01)

(58) Field of Classification Search
CPC ....... F16H 2061/1284; F16H 2061/124; F16H 61/12; F16H 61/662; F16H 59/40; F16H 59/42

See application file for complete search history.

(56) References Cited

U.S. PATENT DOCUMENTS

| 6,073,072 | A  |   | 6/2000  | Ishii et al.   |                |
|-----------|----|---|---------|----------------|----------------|
| 7,192,383 | B2 |   | 3/2007  | Shimada et al. |                |
| 7,510,501 | B2 |   | 3/2009  | Oshita et al.  |                |
| 8,798,877 | B2 | * | 8/2014  | Ayabe          | F16H 61/66259  |
|           |    |   |         |                | 701/51         |

FOREIGN PATENT DOCUMENTS

| JP | 10-205614 A   | 8/1998  |
|----|---------------|---------|
| JP | 11-280886 A   | 10/1999 |
| JP | 2004-116392 A | 4/2004  |
| JP | 2004-124968 A | 4/2004  |
| JP | 2005-291395 A | 10/2005 |
| JP | 2007-092857 A | 4/2007  |
| JP | 2010-249004 A | 11/2010 |

* cited by examiner

*Primary Examiner* — Erin D Bishop
(74) *Attorney, Agent, or Firm* — Carrier Blackman & Associates, P.C.; Joseph P. Carrier; William D. Blackman

(57) ABSTRACT

A vehicle control device includes a belt slippage determination unit which determines whether or not slippage of a belt has occurred based on rotation of a drive pulley and rotation of a driven pulley, an output state determination unit which determines an output state of a sensor that acquires a signal corresponding to the rotation of the driven pulley, and a speed of rotation limitation unit which controls an upper limit of the speed of rotation of the drive source based on the output state of the sensor when slippage of the belt is detected by the belt slippage determination unit.

10 Claims, 6 Drawing Sheets

VEHICLE CONTROL DEVICE, VEHICLE, AND VEHICLE CONTROL METHOD

CROSS-REFERENCE TO RELATED APPLICATION

This application is based upon and claims the benefit of priority from Japanese Patent Application No. 2018-215543 filed on Nov. 16, 2018, the contents of which are incorporated herein by reference.

BACKGROUND OF THE INVENTION

Field of the Invention

The present invention relates to a vehicle control device, a vehicle, and a vehicle control method.

Description of the Related Art

Vehicles that are equipped with continuously variable transmissions (CVT) have been attracting attention. Since a continuously variable transmission does not use gears, the number of parts is small, and weight as well as costs can be reduced. Further, since a continuously variable transmission does not undergo shocks when shifting between gears, it can contribute to an improvement in riding comfort.

A belt-type continuously variable transmission includes a drive pulley, a driven pulley, and a belt that is entrained around the drive pulley and the driven pulley. By appropriately controlling a hydraulic pressure supplied to the drive pulley and the driven pulley, the gear ratio can be appropriately changed.

A continuously variable transmission is known, which is configured in a manner so that the gear ratio becomes maximum in a state in which a movable sheave provided in the drive pulley is placed in contact with a wall member constituting part of a hydraulic actuator of the drive pulley. In such a continuously variable transmission, in the case that the hydraulic pressure supplied to the drive pulley is insufficient, the movable sheave provided in the drive pulley is placed in contact with the wall member constituting part of the hydraulic actuator of the drive pulley. By the movable sheave provided in the drive pulley being placed in contact with the wall member constituting part of the hydraulic actuator provided in the drive pulley, a clamping pressure applied with respect to the belt can be adequately obtained in the drive pulley. Therefore, in such a continuously variable transmission, it is possible to prevent slippage of the belt from occurring, even in the case that the hydraulic pressure supplied to the drive pulley is insufficient.

In Japanese Laid-Open Patent Publication No. 2007-092857, it is disclosed that, in the case that the temperature of the belt becomes greater than or equal to a predetermined value, a control for regulating the torque of a power source is executed as a belt protection control.

SUMMARY OF THE INVENTION

It may be considered to configure the continuously variable transmission in a manner so that the gear ratio becomes maximum in a state in which the movable sheave provided in the drive pulley is not in contact with the wall member constituting part of the hydraulic actuator of the drive pulley. In such a continuously variable transmission, since the movable sheave provided in the drive pulley does not come into contact with the wall member constituting part of the hydraulic actuator of the drive pulley, in the case that the hydraulic pressure supplied to the drive pulley is insufficient, the clamping pressure applied with respect to the belt is insufficient in the drive pulley. When the clamping pressure applied with respect to the belt is insufficient in the drive pulley, there is a concern that breakage of the belt could occur due to generation of heat caused by slippage of the belt. If breakage of the belt occurs, it becomes difficult for the vehicle to travel. On the other hand, in the case that rotation of the drive source is simply limited when slippage of the belt is detected, there is a concern that the traveling performance of the vehicle may be excessively limited.

An object of the present invention is to provide a vehicle control device, a vehicle, and a vehicle control method, which are capable of preventing the occurrence of breakage of a belt, together with suppressing an excessive limitation on the traveling performance of a vehicle.

A vehicle control device according to one aspect of the present invention controls a vehicle equipped with a continuously variable transmission, the transmission including a drive pulley, a driven pulley, and a belt that is entrained around the drive pulley and the driven pulley, the vehicle control device comprising a belt slippage determination unit configured to determine whether or not slippage of the belt has occurred based on rotation of the drive pulley and rotation of the driven pulley, an output state determination unit configured to determine an output state of a sensor that acquires a signal corresponding to the rotation of the driven pulley, and a speed of rotation limitation unit configured to limit a speed of rotation of a drive source that drives rotation of the drive pulley, wherein, when slippage of the belt is detected by the belt slippage determination unit, the speed of rotation limitation unit controls an upper limit of the speed of rotation of the drive source, on a basis of a determination made by the output state determination unit of the output state of the sensor.

A vehicle according to another aspect of the present invention comprises the vehicle control device as described above.

A vehicle control method according to another aspect of the present invention is a method for controlling a vehicle equipped with a continuously variable transmission, the transmission including a drive pulley, a driven pulley, and a belt that is entrained around the drive pulley and the driven pulley, the vehicle control method comprising a step of detecting slippage of the belt based on rotation of the drive pulley and rotation of the driven pulley, a step of determining an output state of a sensor configured to acquire a signal corresponding to the rotation of the driven pulley, and a step of controlling an upper limit of the speed of rotation of a drive source that drives rotation of the drive pulley, on a basis of the output state of the sensor when slippage of the belt is detected.

According to the present invention, the vehicle control device, the vehicle, and the vehicle control method can be provided, which are capable of suppressing breakage of the belt.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a vehicle control device, a vehicle, and a vehicle control method according to the present invention will be presented and described in detail below with reference to the accompanying drawings.

Embodiment

Figure 1:
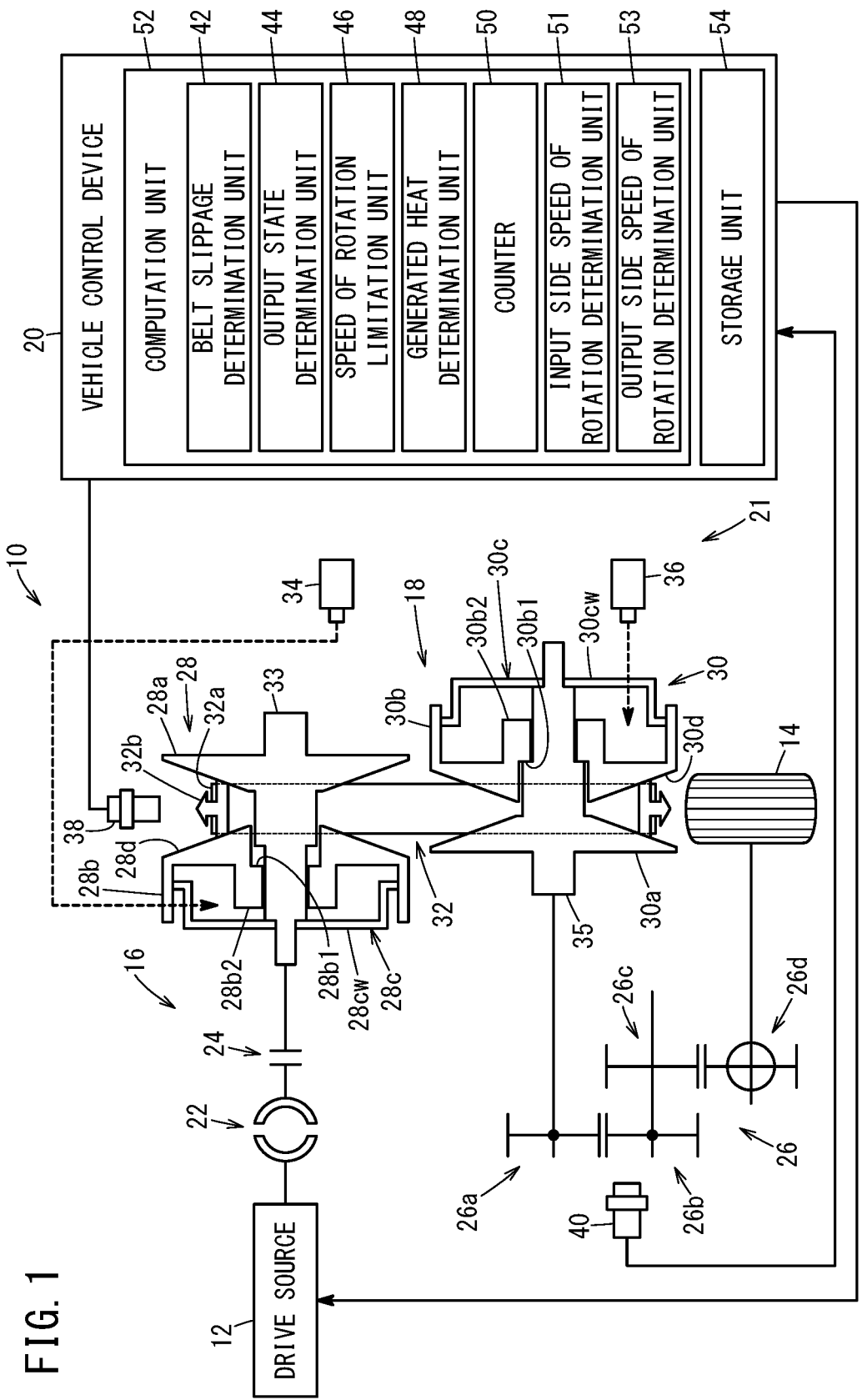
FIG. 1 is a block diagram showing a vehicle according to an embodiment of the present invention.

A vehicle control device, a vehicle, and a vehicle control method according to embodiments of the present invention will be described with reference to the drawings. FIG. 1 is a block diagram showing a vehicle according to the present embodiment.

A vehicle 10 according to the present embodiment is equipped with a drive source 12 and drive wheels 14. A torque converter 22, a clutch 24, a continuously variable transmission 18, and a gear device 26 are provided on a power transmission path 16 between the drive source 12 and the drive wheels 14. The vehicle 10 is further equipped with a vehicle control device 20 and a hydraulic pressure control device 21. Although the vehicle 10 is equipped with other constituent elements apart from those noted above, description of such elements is omitted herein.

The drive source (traveling drive source) 12 is an engine (internal combustion engine), for example. However, the drive source 12 may also be an electric motor.

The continuously variable transmission 18 includes a drive pulley (first pulley, primary pulley) 28, a driven pulley (second pulley, secondary pulley) 30, and a belt 32 that is entrained around the drive pulley 28 and the driven pulley 30.

The drive pulley 28 includes a first fixed sheave (sheave) 28a that is fixed to an input shaft 33, a first movable sheave (sheave) 28b that is capable of being displaced only in the axial direction of the input shaft 33, and a first hydraulic actuator (hydraulic actuator) 28c that drives the first movable sheave 28b in the axial direction. The drive pulley 28 is a variable pulley having an effective diameter, i.e., a belt entrainment diameter, which is capable of being varied. The belt 32 is entrained around a V-groove 28d formed between the first fixed sheave 28a and the first movable sheave 28b. The belt 32 is constituted by a ring 32a and a plurality of elements 32b arranged along the ring 32a. The width of the V-groove 28d of the drive pulley 28 varies depending on the axial position of the first movable sheave 28b.

A movable range of the first movable sheave 28b is set so that the first movable sheave 28b can be moved in the axial direction between a closed side end (first closed side end) and an open side end (first open side end). The first closed side end is a position at which the first movable sheave 28b is closest to the first fixed sheave 28a, namely, a position at which the width of the V-groove 28d of the drive pulley 28 is narrowest. More specifically, the first closed side end is a position at which an abutment portion 28b1 provided on the first movable sheave 28b abuts against the first fixed sheave 28a.

The first open side end is a position at which the first movable sheave 28b is farthest from the first fixed sheave 28a, namely, a position at which the width of the V-groove 28d of the drive pulley 28 is widest. More specifically, the first open side end is a position at which a contacting portion 28b2 provided on the first movable sheave 28b contacts a wall member 28cw constituting part of the first hydraulic actuator 28c. The first hydraulic actuator 28c is used in order to change the width of the V-groove 28d of the drive pulley 28.

The driven pulley 30 includes a second fixed sheave (sheave) 30a that is fixed to an output shaft 35, a second movable sheave (sheave) 30b that is capable of being displaced only in the axial direction of the output shaft 35, and a second hydraulic actuator 30c that drives the second movable sheave 30b in the axial direction. The driven pulley 30 is a variable pulley having an effective diameter, i.e., a belt entrainment diameter, which is capable of being varied. The belt 32 is entrained around a V-groove 30d formed between the second fixed sheave 30a and the second movable sheave 30b. The width of the V-groove 30d of the driven pulley 30 varies depending on the axial position of the second movable sheave 30b.

A movable range of the second movable sheave 30b is set so that the second movable sheave 30b can be moved in the axial direction between a closed side end (second closed side end) and an open side end (second open side end). The second closed side end is a position at which the second movable sheave 30b is closest to the second fixed sheave 30a, namely, a position at which the width of the V-groove 30d of the driven pulley 30 is narrowest. More specifically, the second closed side end is a position at which an abutment portion 30b1 provided on the second movable sheave 30b abuts against the second fixed sheave 30a.

The second open side end is a position at which the second movable sheave 30b is farthest from the second fixed sheave 30a, namely, a position at which the width of the V-groove 30d of the driven pulley 30 is widest. More specifically, the second open side end is a position at which a contacting portion 30b2 provided on the second movable sheave 30b contacts a wall member 30cw constituting part of the second hydraulic actuator 30c. The second hydraulic actuator 30c is used in order to change the width of the V-groove 30d of the driven pulley 30.

Figures 2A, 2B:
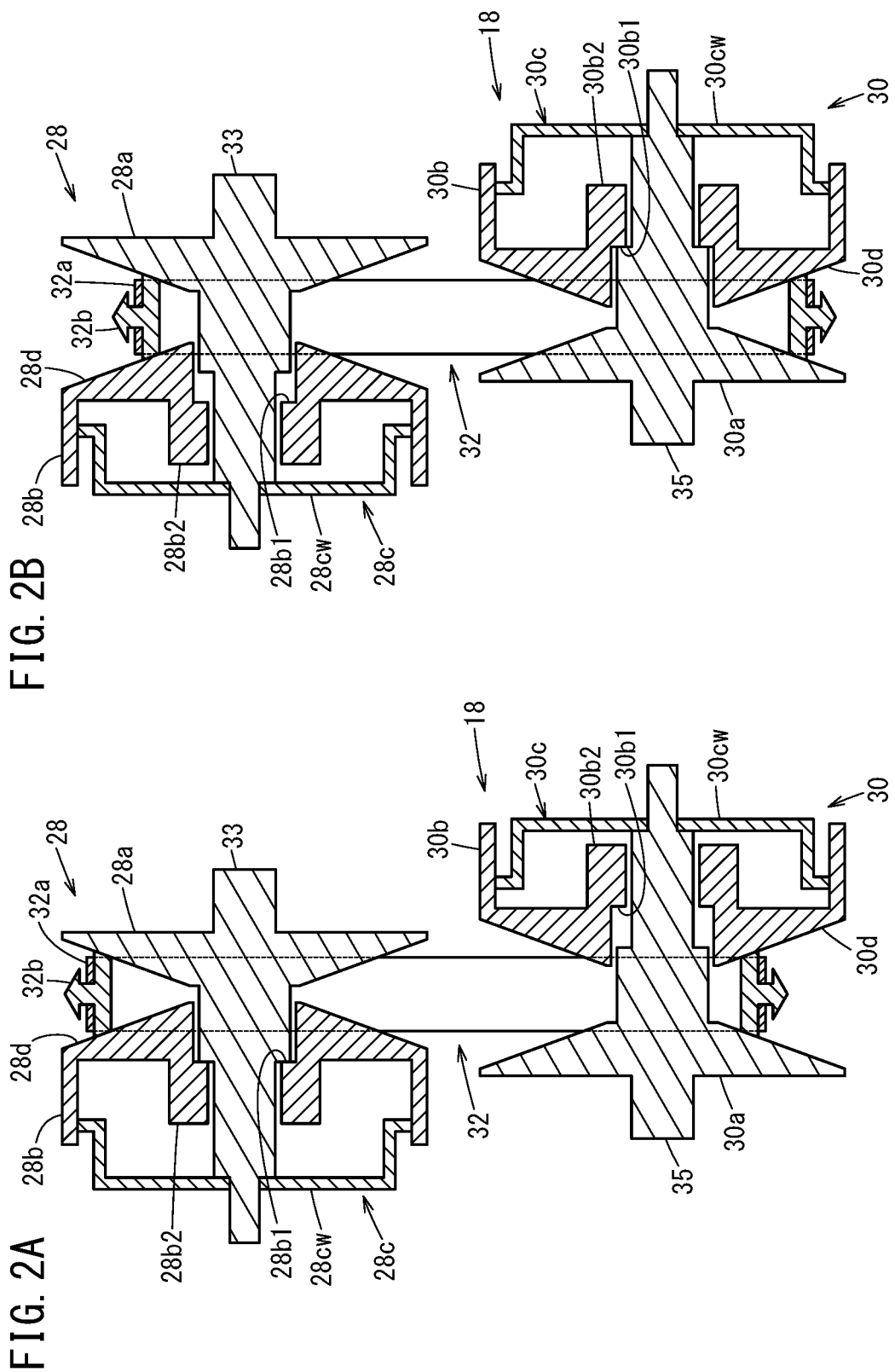
FIGS. 2A and 2B are views showing states of a continuously variable transmission.

FIG. 2A is a view showing a state in which the gear ratio is set to a minimum. The continuously variable transmission 18 is configured in a manner so that the gear ratio becomes minimum in a state in which the abutment portion 28b1 of the first movable sheave 28b provided in the drive pulley 28 is placed in contact with the first fixed sheave 28a provided in the drive pulley 28. When the abutment portion 28b1 of the first movable sheave 28b provided in the drive pulley 28 abuts against the first fixed sheave 28a provided in the drive pulley 28, the driven pulley 30 becomes situated in the following manner. More specifically, at this time, the second movable sheave 30b provided in the driven pulley 30 is not in contact with the wall member 30cw provided in the driven pulley 30.

FIG. 2B is a view showing a state in which the gear ratio is set to a maximum. The continuously variable transmission 18 is configured in a manner so that the gear ratio becomes maximum in a state in which the abutment portion 30b1 of the second movable sheave 30b provided in the driven pulley 30 is placed in contact with the second fixed sheave 30a provided in the driven pulley 30. When the abutment portion 30b1 of the second movable sheave 30b provided in the driven pulley 30 abuts against the second fixed sheave 30a provided in the driven pulley 30, the drive pulley 28 becomes situated in the following manner. More specifically, at this time, the first movable sheave 28b provided in the drive pulley 28 is not in contact with the wall member 28cw provided in the drive pulley 28.

In the foregoing manner, with the continuously variable transmission 18 according to the present embodiment, the gear ratio becomes maximum in a state in which the first movable sheave 28b provided in the drive pulley 28 does not contact the wall member 28cw constituting part of the first hydraulic actuator 28c provided in the drive pulley 28.

The fact as to why such a configuration is provided, so that the gear ratio becomes maximum in a state in which the first movable sheave 28b provided in the drive pulley 28 does not contact the wall member 28cw constituting part of the first hydraulic actuator 28c provided in the drive pulley 28, is for the following reasons. More specifically, it is considered that, in order to improve the transmission efficiency between the drive pulley 28 and the driven pulley 30, the structural components thereof are configured in a manner so that the elements 32b and the sheaves 28a, 28b, 30a, and 30b are kept in point contact rather than in line contact. In the case that the elements 32b and the sheaves 28a, 28b, 30a, and 30b are kept in point contact, since the contact area therebetween is reduced, frictional wearing of the elements 32b and the sheaves 28a, 28b, 30a, and 30b is likely to occur. In particular, when the effective diameter, i.e., the belt entrainment diameter, of the drive pulley 28 is small, the elements 32b and the sheaves 28a, 28b, 30a, and 30b are likely to become worn. In order to suppress wearing of the elements 32b and the sheaves 28a, 28b, 30a, and 30b, it is preferable for the minimum effective diameter of the drive pulley 28 not to become excessively small. Thus, according to the present embodiment, the gear ratio becomes maximum in a state in which the first movable sheave 28b provided in the drive pulley 28 does not contact the wall member 28cw constituting part of the first hydraulic actuator 28c provided in the drive pulley 28.

The hydraulic pressure supplied to the first hydraulic actuator 28c is adjusted using a linear solenoid valve 34 or the like that is provided in the hydraulic pressure control device 21. The hydraulic pressure supplied to the second hydraulic actuator 30c is adjusted using a linear solenoid valve 36 or the like that is provided in the hydraulic pressure control device 21. The hydraulic pressure control device 21 appropriately controls the hydraulic pressure supplied to the first hydraulic actuator 28c, and the hydraulic pressure supplied to the second hydraulic actuator 30c. Although the hydraulic pressure control device 21 is equipped with other constituent elements apart from the linear solenoid valves 34 and 36, description of such elements is omitted herein. The width of the V-groove 28d of the drive pulley 28 and the width of the V-groove 30d of the driven pulley 30 are changed in accordance with the hydraulic pressure supplied to the first hydraulic actuator 28c, and the hydraulic pressure supplied to the second hydraulic actuator 30c. Consequently, the entrainment diameters of the belt 32 are changed, and the gear ratio is changed in a continuous manner.

A speed of rotation sensor that detects the speed of rotation of the drive pulley 28, and more specifically, an input side speed of rotation sensor 38 is disposed in the vicinity of the drive pulley 28.

The gear device 26 is equipped with a secondary drive gear 26a, a secondary driven gear (gear) 26b, a final drive gear 26c, and a final driven gear 26d. The secondary drive gear 26a is coupled to the output shaft 35 of the continuously variable transmission 18. A speed of rotation sensor that detects the speed of rotation of any one from among the plurality of gears 26a to 26d provided in the gear device 26, and more specifically, an output side speed of rotation sensor (sensor) 40, is disposed in the vicinity of the gear device 26. The output side speed of rotation sensor 40 detects the speed of rotation of the secondary driven gear 26b, for example. The gears 26a to 26d provided in the gear device 26 rotate at a speed of rotation that corresponds to the speed of rotation of the driven pulley 30. Accordingly, the output side speed of rotation sensor 40 is capable of outputting a signal corresponding to the rotation of the driven pulley 30.

A vehicle control device (ECU: Electronic Control Unit) 20 controls the speed of rotation of the drive source 12, on the basis of operations input by a user which are performed via a non-illustrated accelerator pedal. The vehicle control device 20 includes a computation unit 52 and a storage unit 54. The computation unit 52 is constituted, for example, by a CPU (Central Processing Unit).

The computation unit 52 comprises a belt slippage determination unit 42, an output state determination unit 44, a speed of rotation limitation unit 46, a generated heat determination unit 48, a counter 50, an input side speed of rotation determination unit 51, and an output side speed of rotation determination unit 53. The belt slippage determination unit 42, the output state determination unit 44, the speed of rotation limitation unit 46, the generated heat determination unit 48, and the counter 50 are realized by programs which are stored in the storage unit 54 being executed by the computation unit 52. Further, the input side speed of rotation determination unit 51 and the output side speed of rotation determination unit 53 are also realized by programs which are stored in the storage unit 54 being executed by the computation unit 52. Although the computation unit 52 is equipped with other constituent elements apart from those noted above, description of such elements is omitted herein.

The belt slippage determination unit 42 determines whether or not slippage of the belt 32 has occurred based on the rotation of the drive pulley 28 and the rotation of the driven pulley 30.

Figure 3:
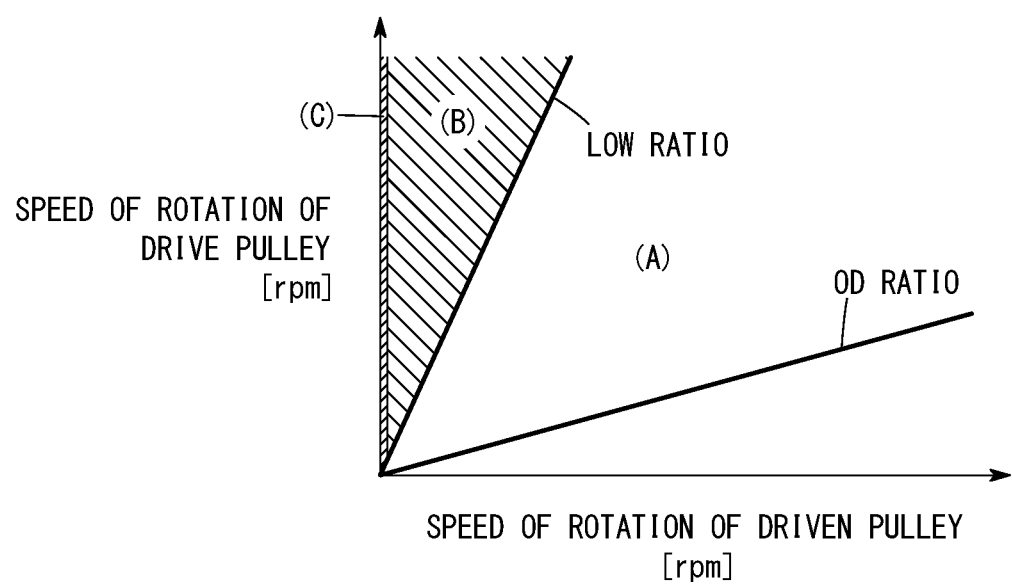
FIG. 3 is a graph showing a relationship between a speed of rotation of a drive pulley and a speed of rotation of a driven pulley.

FIG. 3 is a graph showing a relationship between the speed of rotation of the drive pulley and the speed of rotation of the driven pulley. An OD ratio line shown in FIG. 3 corresponds to a case in which the gear ratio is set to a minimum. An LOW ratio line in FIG. 3 corresponds to a case in which the gear ratio is set to a maximum.

In the case that slippage of the belt 32 is not occurring, the speed of rotation of the drive pulley 28 and the speed of rotation of the driven pulley 30 lie within the region that is sandwiched between the OD ratio line and the LOW ratio line, and namely, within the region (A) shown in FIG. 3. In the case that the speed of rotation of the drive pulley 28 and the speed of rotation of the driven pulley 30 lie within the region that is sandwiched between the OD ratio line and the LOW ratio line, and namely, within the region (A) shown in FIG. 3, the belt slippage determination unit 42 determines that slippage of the belt 32 is not occurring.

For example, in the case that the hydraulic pressure supplied to the drive pulley 28 is insufficient due to a failure of the linear solenoid valve 34 or the like, the following situation occurs. More specifically, since the first movable sheave 28b provided in the drive pulley 28 does not contact the wall member 28cw constituting part of the first hydraulic actuator 28c of the drive pulley 28, the clamping pressure applied to the belt 32 is insufficient in the drive pulley 28. When the clamping pressure applied to the belt 32 is insufficient in the drive pulley 28, slippage of the belt 32 occurs. In this case, the ratio of the speed of rotation of the drive pulley 28 to the speed of rotation of the driven pulley 30 is greater than the ratio corresponding to the LOW ratio line. More specifically, in such a case, the speed of rotation of the drive pulley 28 and the speed of rotation of the driven pulley 30 lie within the region (B) shown in FIG. 3.

The belt slippage determination unit 42 determines whether or not slippage of the belt 32 has occurred, on the basis of the ratio of the speed of rotation of the drive pulley 28 to the speed of rotation of the driven pulley 30 being greater than or equal to a threshold value (ratio threshold value). Such a threshold value may be set in accordance with a ratio corresponding to the LOW ratio line. For example, such a threshold value can be set by adding a certain margin to the ratio corresponding to the LOW ratio line.

In the case that a failure such as a disconnection or the like has occurred in the output of the output side speed of rotation sensor 40, the signal that is output from the output side speed of rotation sensor 40 almost stops being supplied to the vehicle control device 20. In this case, the ratio of the speed of rotation of the drive pulley 28 to the speed of rotation of the driven pulley 30 becomes extremely large. More specifically, in such a case, the speed of rotation of the drive pulley 28 and the speed of rotation of the driven pulley 30 lie within the region (C) shown in FIG. 3.

On the basis of the output from the input side speed of rotation sensor 38, the input side speed of rotation determination unit 51 determines the input side speed of rotation, for example, the speed of rotation of the drive pulley 28.

On the basis of the output from the output side speed of rotation sensor 40, the output side speed of rotation determination unit 53 determines the output side speed of rotation, for example, the speed of rotation of the driven pulley 30.

Based on the result of the determination made by the output side speed of rotation determination unit 53, the counter 50 counts at a predetermined sampling period the number of times that the output from the output side speed of rotation sensor 40 becomes greater than or equal to the speed of rotation threshold value.

The output state determination unit 44 determines that there is an output from the output side speed of rotation sensor 40, based on an output being obtained from the output side speed of rotation sensor 40 that is greater than or equal to a predetermined level. More specifically, the output state determination unit 44 determines that there is an output from the output side speed of rotation sensor 40 when the count number in the counter 50 reaches a count number threshold value. In the case that the output state determination unit 44 determines that there is an output from the output side speed of rotation sensor 40, an output YES determination flag, which indicates that there is an output from the output side speed of rotation sensor 40, is changed from an L level to an H level.

The generated heat determination unit 48 determines whether or not a cumulative value of the amount of generated heat due to slippage of the belt 32, and more specifically, a cumulative value of the amount of generated heat due to slippage of the belt 32, is greater than or equal to a cumulative amount of generated heat threshold value. The cumulative amount of generated heat can be calculated, for example, by integrating the amounts of heat in individual time intervals (periods) due to slippage of the belt 32. The amounts of generated heat in the individual time intervals can be calculated, for example, based on the speed of rotation of the drive pulley 28, the speed of rotation of the driven pulley 30, and the load imposed on the contact surface of the belt 32, etc. Moreover, a table of the amounts of generated heat corresponding to the speed of rotation of the drive pulley 28 and the speed of rotation of the driven pulley 30, etc., may be prepared in advance based on a simulation or actual measurements, and the amounts of generated heat at the individual time intervals may be determined on the basis of such a table.

The speed of rotation limitation unit 46 limits the upper limit of the speed of rotation of the drive source 12 that drives rotation of the drive pulley 28 in the following manner.

In the case it is determined by the belt slippage determination unit 42 that slippage of the belt 32 is not occurring, the speed of rotation limitation unit 46 limits the speed of rotation in a normal control. In this instance, the normal control defines a control that is used when slippage of the belt 32 is not occurring. In the normal control, the speed of rotation limitation unit 46 limits the upper limit of the speed of rotation of the drive source 12 on the basis of a predetermined algorithm.

Even in the case it is determined by the belt slippage determination unit 42 that slippage of the belt 32 has occurred, in the event it is determined by the output state determination unit 44 that there is no output from the output side speed of rotation sensor 40, the speed of rotation limitation unit 46 limits the speed of rotation in the following manner. More specifically, the speed of rotation limitation unit 46 limits the upper limit of the speed of rotation of the drive source 12 to a first speed of rotation. The first speed of rotation, for example, is 4200 rpm. In such a case, the upper limit of the speed of rotation of the drive source 12 is limited to the first speed of rotation, which is a relatively large speed of rotation, for the following reasons. More specifically, when a failure such as a disconnection or the like occurs in the output of the output side speed of rotation sensor 40, the speed of rotation of the drive pulley 28 and the speed of rotation of the driven pulley 30 lie within the region (C) shown in FIG. 3, and the belt slippage determination unit 42 determines that slippage of the belt 32 has occurred. However, the reason as to why the belt slippage determination unit 42 determined that slippage of the belt 32 has occurred is considered to be caused by a failure such as a disconnection or the like in the output of the output side speed of rotation sensor 40. In such a case, it is not desirable for traveling of the vehicle 10 to be significantly limited merely due to the occurrence of a failure such as a disconnection or the like in the output of the output side speed of rotation sensor 40. Thus, according to the present embodiment, in a case such as that referred to above, the upper limit of the speed of rotation of the drive source 12 is limited to the first speed of rotation, which is comparatively large.

In the case that the drive source 12 is rotated at the first speed of rotation, which is comparatively large, a centrifugal hydraulic pressure of a certain degree is generated in the drive pulley 28, and consequently, a certain degree of force is applied to the first movable sheave 28b in a direction so that the width of the V-groove 28d becomes narrower. Upon doing so, the clamping pressure applied to the belt 32 is assured to a certain extent in the drive pulley 28, and to a certain extent, the driven pulley 30 can be caused to rotate. Accordingly, in the case that the upper limit of the speed of rotation of the drive source 12 is limited to the first speed of rotation, which is comparatively large, the traveling performance of the vehicle 10 can be assured to a certain extent.

Even in the case that slippage of the belt 32 has occurred, in the event that the cumulative amount of generated heat is less than the cumulative amount of generated heat threshold value, the speed of rotation limitation unit 46 limits the speed of rotation in the following manner. More specifically, the speed of rotation limitation unit 46 limits the upper limit of the speed of rotation of the drive source 12 to the first speed of rotation, which is comparatively large. As noted previously, the first speed of rotation, for example, is 4200 rpm. In such a case, limiting of the upper limit of the speed of rotation of the drive source 12 to the first speed of rotation, which is a comparatively large speed of rotation, is in order to prevent the traveling performance of the vehicle 10 from being excessively limited, at a stage at which the cumulative amount of generated heat due to slippage of the belt 32 is comparatively small, and more specifically, at a stage at which the possibility of breakage of the belt 32 is low.

In the case that slippage of the belt 32 has occurred, and the cumulative amount of generated heat is greater than or equal to the cumulative amount of generated heat threshold value, the speed of rotation limitation unit 46 limits the speed of rotation in the following manner. More specifically, the speed of rotation limitation unit 46 limits the upper limit of the speed of rotation of the drive source 12 to a second speed of rotation, which is smaller than the first speed of rotation. The second speed of rotation, for example, is 1500 rpm. In such a case, limiting of the upper limit of the speed of rotation of the drive source 12 to the second speed of rotation is in order to reliably prevent breakage of the belt 32.

Figure 4:
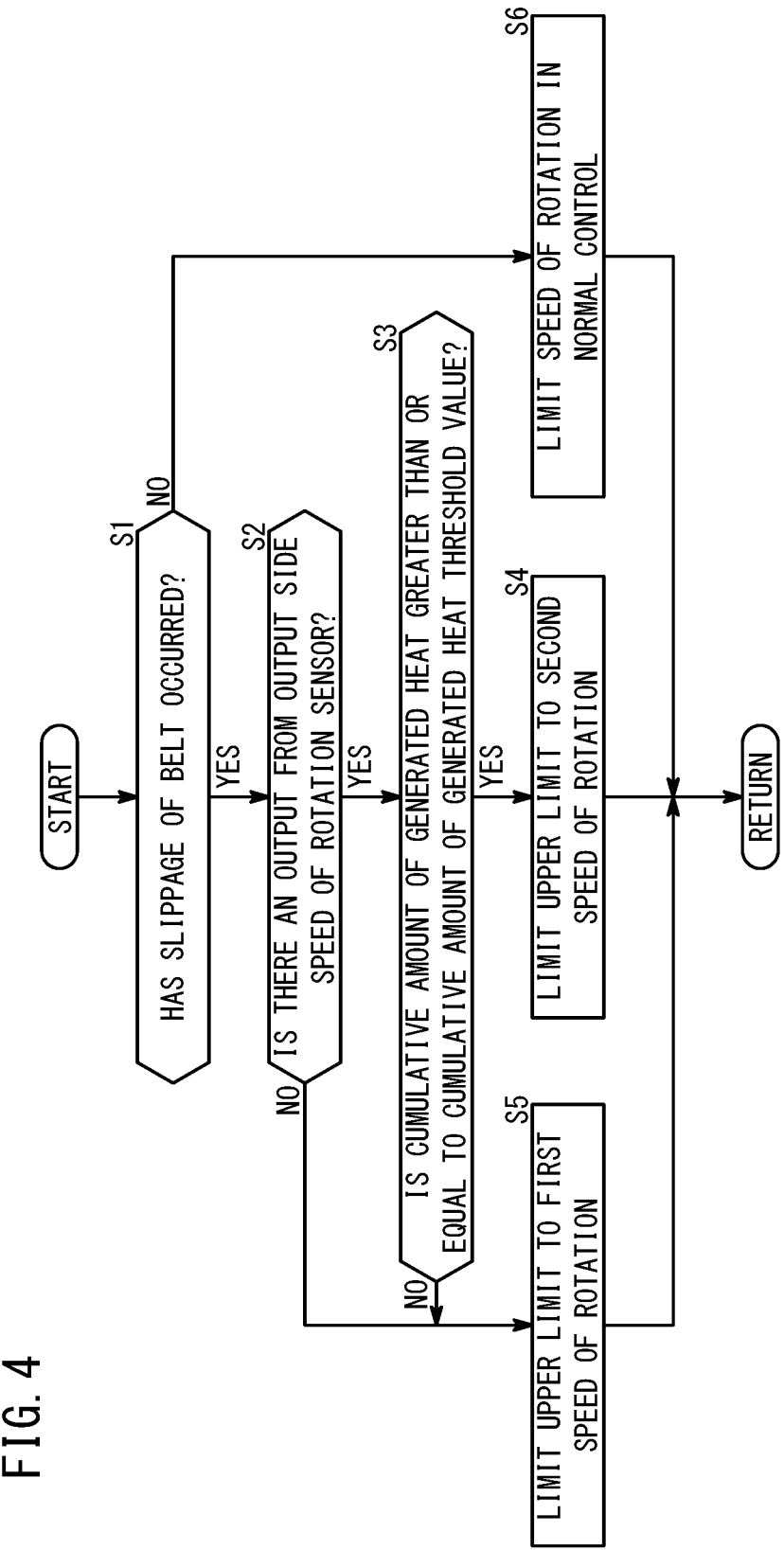
FIG. 4 is a flowchart showing operations of a vehicle control device according to the embodiment.

Operations of the vehicle control device 20 according to the present embodiment will be described with reference to FIG. 4. FIG. 4 is a flowchart showing operations of the vehicle control device according to the present embodiment.

First, in step S1, the belt slippage determination unit 42 determines whether or not slippage of the belt 32 has occurred. In the case that the belt slippage determination unit 42 has determined that slippage of the belt 32 has occurred (YES in step S1), the process transitions to step S2. In the case that the belt slippage determination unit 42 has determined that slippage of the belt 32 has not occurred (NO in step S1), the process transitions to step S6.

In step S2, the output state determination unit 44 determines the output state of the output side speed of rotation sensor 40, and more specifically, determines the presence or absence of an output from the output side speed of rotation sensor 40. In the case that the output state determination unit 44 determines that there is an output from the output side speed of rotation sensor 40 (YES in step S2), the process transitions to step S3. In the case that the output state determination unit 44 determines that there is not an output from the output side speed of rotation sensor 40 (NO in step S2), the process transitions to step S5.

In step S3, the generated heat determination unit 48 determines whether or not the cumulative amount of generated heat due to slippage of the belt 32 is greater than or equal to the cumulative amount of generated heat threshold value. In the case that the generated heat determination unit 48 has determined that the accumulated amount of generated heat due to slippage of the belt 32 is greater than or equal to the cumulative amount of generated heat threshold value (YES in step S3), the process transitions to step S4. In the case that the generated heat determination unit 48 has determined that the accumulated amount of generated heat due to slippage of the belt 32 is less than the cumulative amount of generated heat threshold value (NO in step S3), the process transitions to step S5.

In step S4, the speed of rotation limitation unit 46 limits the upper limit of the speed of rotation of the drive source 12 to the second speed of rotation. As noted previously, the second speed of rotation, for example, is 1500 rpm.

In step S5, the speed of rotation limitation unit 46 limits the upper limit of the speed of rotation of the drive source 12 to the first speed of rotation. As noted previously, the first speed of rotation, for example, is 4200 rpm.

In step S6, the speed of rotation limitation unit 46 limits the speed of rotation in the normal control. As noted previously, the normal control defines a control that is used when slippage of the belt 32 is not occurring.

Figure 5:
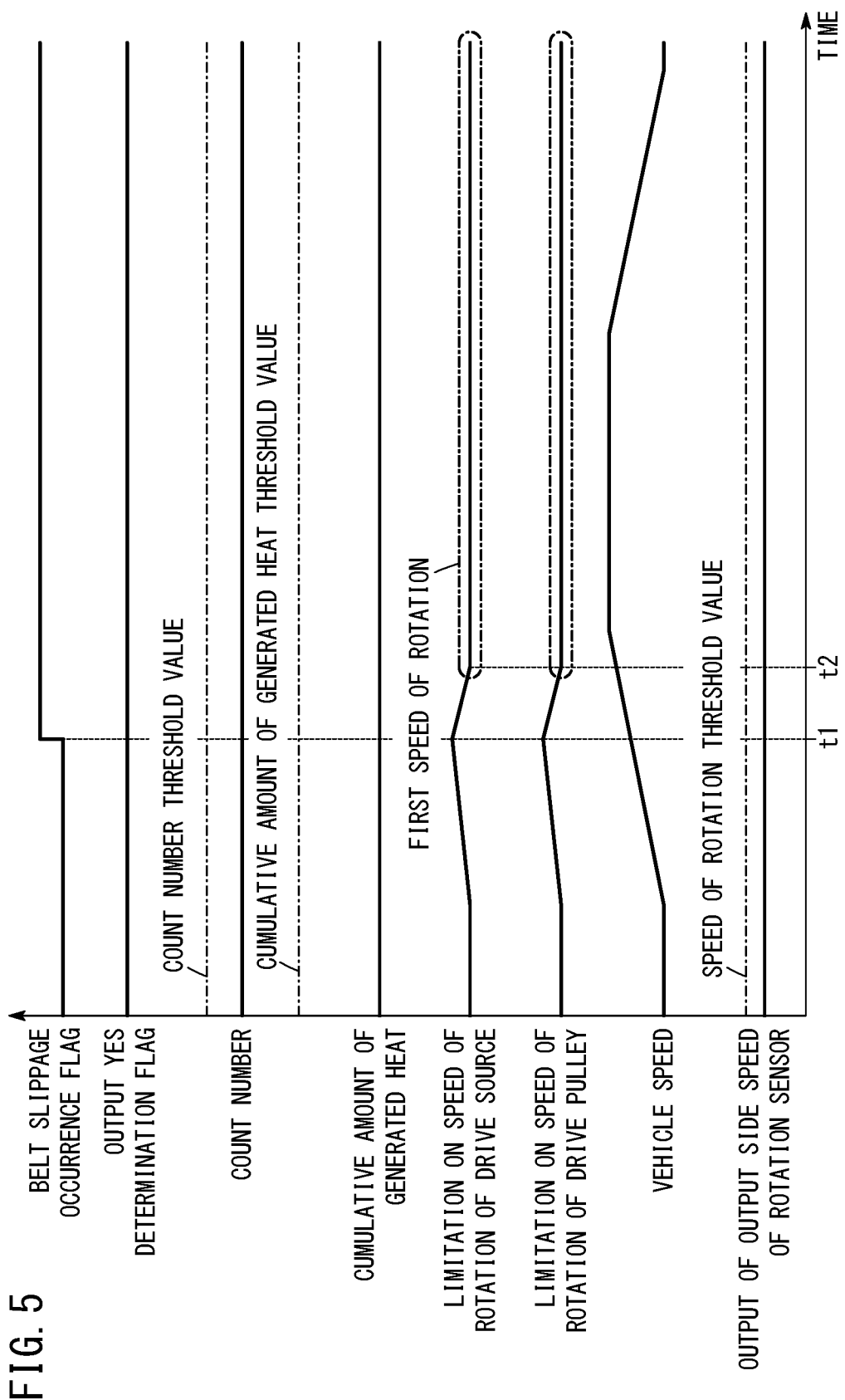
FIG. 5 is a time chart showing one example of operations of the vehicle control device according to the embodiment.

FIG. 5 is a time chart showing one example of operations of the vehicle control device according to the present embodiment. FIG. 5 shows an example of a case in which a disconnection occurs in the output of the output side speed of rotation sensor 40.

Since a disconnection is taking place in the output of the output side speed of rotation sensor 40, even if the vehicle speed changes, there continues to be no output from the output side speed of rotation sensor 40.

Prior to it being determined by the belt slippage determination unit 42 that slippage of the belt 32 has occurred, the speed of rotation limitation unit 46 limits the speed of rotation in the normal control. As noted previously, the normal control defines a control that is used when slippage of the belt 32 is not occurring.

At timing t1, it is determined by the belt slippage determination unit 42 that slippage of the belt 32 has occurred. When it is determined by the belt slippage determination unit 42 that slippage of the belt 32 has occurred, the computation unit 52 changes the belt slippage occurrence flag from the L level to the H level.

Although the belt slippage occurrence flag has changed from the L level to the H level, since the accumulated amount of generated heat is less than the accumulated amount of generated heat threshold value, at timing t1, the speed of rotation limitation unit 46 limits the speed of rotation in the following manner. More specifically, the speed of rotation limitation unit 46 limits the upper limit of the speed of rotation of the drive source 12 to the first speed of rotation, which is comparatively large. However, the speed of rotation limitation unit 46 does not rapidly change the upper limit of the speed of rotation of the drive source 12 to the first speed of rotation, but rather, gradually changes the limitation on the upper limit of the speed of rotation of the drive source 12.

At timing t2, the upper limit of the speed of rotation of the drive source 12 becomes the first speed of rotation. In relation to the limitation on the upper limit of the speed of rotation of the drive pulley 28 as well, the same controls are performed.

Since the output of the output side speed of rotation sensor 40 is disconnected, the output of the output side speed of rotation sensor 40 does not become greater than or equal to the speed of rotation threshold value. For this reason, the count number in the counter 50 is maintained at zero. Since the count number in the counter 50 remains at zero, the count number of the counter 50 does not reach the count number threshold value. Therefore, the output YES determination flag which indicates that there is an output from the output side speed of rotation sensor 40 is maintained at the L level.

Figure 6:
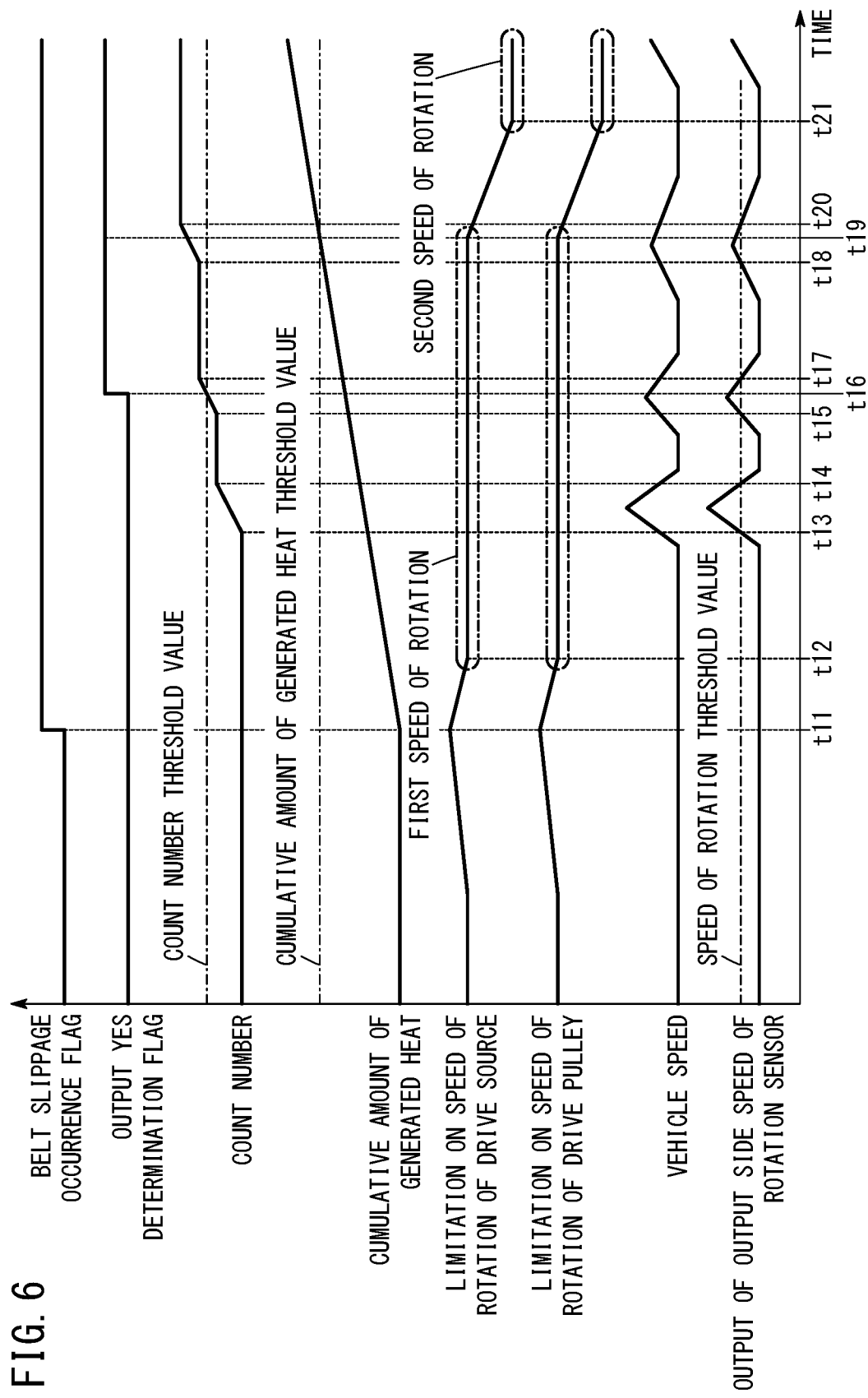
FIG. 6 is a time chart showing another example of operations of the vehicle control device according to the embodiment.

FIG. 6 is a time chart showing another example of operations of the vehicle control device according to the present embodiment. FIG. 6 shows an example of a case in which no problem is occurring such as a disconnection in the output of the output side speed of rotation sensor 40. In FIG. 6, an example is shown in which the vehicle 10 travels uphill.

Prior to it being determined by the belt slippage determination unit 42 that slippage of the belt 32 has occurred, as noted above, the speed of rotation limitation unit 46 limits the speed of rotation in the normal control.

At timing t11, it is determined by the belt slippage determination unit 42 that slippage of the belt 32 has occurred. When it is determined by the belt slippage determination unit 42 that slippage of the belt 32 has occurred, the computation unit 52 changes the belt slippage occurrence flag from the L level to the H level. After timing t11, the state in which slippage of the belt 32 occurs is not eliminated, and the cumulative amount of generated heat due to slippage of the belt 32 gradually increases.

Although the belt slippage occurrence flag has changed from the L level to the H level, since the accumulated amount of generated heat is less than the accumulated amount of generated heat threshold value, at timing t11, the speed of rotation limitation unit 46 performs a control in the following manner. More specifically, the speed of rotation limitation unit 46 limits the upper limit of the speed of rotation of the drive source 12 to the first speed of rotation, which is comparatively large. However, the speed of rotation limitation unit 46 does not rapidly change the upper limit of the speed of rotation of the drive source 12 to the first speed of rotation, but rather, gradually changes the limitation on the upper limit of the speed of rotation of the drive source 12.

At timing t12, the upper limit of the speed of rotation of the drive source 12 becomes the first speed of rotation. In relation to the limitation on the upper limit of the speed of rotation of the drive pulley 28 as well, the same controls are performed.

At timing t13, the output of the output side speed of rotation sensor 40 becomes greater than or equal to the speed of rotation threshold value. As noted previously, based on the result of the determination made by the output side speed of rotation determination unit 53, the counter 50 counts at a predetermined sampling period the number of times that the output from the output side speed of rotation sensor 40 becomes greater than or equal to the speed of rotation threshold value. Therefore, the count number in the counter 50 gradually increases.

Moreover, even though slippage of the belt 32 is occurring, the reason as to why the output of the output side speed of rotation sensor 40 becomes greater than or equal to the speed of rotation threshold value is as follows. More specifically, when the drive pulley 28 is rotated at a comparatively high speed, centrifugal oil pressure is generated, and consequently, a force is applied to the first movable sheave 28b in a direction so that the width of the V-groove 28d becomes narrower. Therefore, the clamping pressure applied to the belt 32 is assured to a certain extent, and the output of the output side speed of rotation sensor 40 becomes greater than or equal to the speed of rotation threshold value.

At timing t14, the output of the output side speed of rotation sensor 40 becomes less than the speed of rotation threshold value. Consequently, increasing of the count number in the counter 50 is stopped. Moreover, in the example shown in FIG. 6, the output of the output side speed of rotation sensor 40 changes abruptly, because slippage of the belt 32 occurs when the vehicle 10 is traveling uphill, and a state in which the vehicle 10 moves forward or stops occurs repeatedly.

At timing t15, the output of the output side speed of rotation sensor 40 becomes greater than or equal to the speed of rotation threshold value. Consequently, the count number in the counter 50 gradually increases.

At timing t16, the count number of the counter 50 reaches the count number threshold value. When the count number in the counter 50 reaches the count number threshold value, the output state determination unit 44 changes the output YES determination flag from the L level to the H level.

At timing t17, the output of the output side speed of rotation sensor 40 becomes less than the speed of rotation threshold value. Consequently, increasing of the count number in the counter 50 is stopped.

At timing t18, the output of the output side speed of rotation sensor 40 becomes greater than or equal to the speed of rotation threshold value. Consequently, the count number in the counter 50 gradually increases.

At timing t19, the generated heat determination unit 48 determines that the cumulative amount of generated heat due to slippage of the belt 32 has reached the cumulative amount of generated heat threshold value. When it is determined by the generated heat determination unit 48 that the cumulative value of the amount of generated heat due to slippage of the belt 32 has reached the cumulative amount of generated heat threshold value, the speed of rotation limitation unit 46 limits the upper limit of the speed of rotation of the drive source 12 to the second speed of rotation. However, the speed of rotation limitation unit 46 does not rapidly change the upper limit of the speed of rotation of the drive source 12 to the second speed of rotation, but rather, gradually changes the limitation on the upper limit of the speed of rotation of the drive source 12.

At timing t20, the output of the output side speed of rotation sensor 40 becomes less than the speed of rotation threshold value. Consequently, increasing of the count number in the counter 50 is stopped.

At timing t21, the upper limit of the speed of rotation of the drive source 12 becomes the second speed of rotation.

In the foregoing manner, according to the present embodiment, even in the case it is determined by the belt slippage determination unit 42 that slippage of the belt 32 has occurred, in the event it is determined by the output state determination unit 44 that there is no output from the output side speed of rotation sensor 40, the following control is performed. More specifically, the upper limit of the speed of rotation of the drive source 12 is limited to the first speed of rotation, which is comparatively large. Therefore, according to the present embodiment, it is possible to prevent a situation in which traveling of the vehicle 10 is significantly limited merely due to the occurrence of a failure such as a disconnection or the like in the output of the output side speed of rotation sensor 40. Further, with the present embodiment, even in the case that slippage of the belt 32 has occurred, in the event that the cumulative amount of generated heat is less than the cumulative amount of generated heat threshold value, the upper limit of the speed of rotation of the drive source 12 is limited to the first speed of rotation, which is comparatively large. Therefore, according to the present embodiment, at a stage at which the possibility of breakage of the belt 32 is low, it is possible to prevent the traveling performance of the vehicle 10 from being excessively limited. Further, with the present embodiment, even in the case that slippage of the belt 32 has occurred, and the cumulative amount of generated heat is greater than or equal to the cumulative amount of generated heat threshold value, the upper limit of the speed of rotation of the drive source 12 is limited to the second speed of rotation, which is smaller than the first speed of rotation. Therefore, according to the present embodiment, it is possible to reliably prevent breakage of the belt 32. In this manner, according to the present embodiment, the vehicle control device 20 can be provided, which is capable of preventing the occurrence of breakage of the belt 32, together with suppressing an excessive limitation on the traveling performance of the vehicle 10.

Modified Embodiments

Although preferred embodiments of the present invention have been described above, the present invention is not limited to the above-described embodiments, and various modifications can be made thereto without departing from the essence and scope of the present invention.

For example, according to the above-described embodiments, although an exemplary case has been described in which the output side speed of rotation sensor 40 detects the speed of rotation of any one from among the plurality of gears 26a to 26d provided in the gear device 26, the present invention is not limited to this feature. The output side speed of rotation sensor 40 may be arranged in the vicinity of the driven pulley 30, and the output side speed of rotation sensor 40 may detect the speed of rotation of the driven pulley 30.

Summarizing the above-described embodiments and the modifications thereof, the characteristic features described below are realized.

The vehicle control device (20) controls the vehicle (10), which is equipped with the continuously variable transmission (18), the transmission (18) including the drive pulley (28), the driven pulley (30), and the belt (32) that is entrained around the drive pulley and the driven pulley, the vehicle control device comprising the belt slippage determination unit (42) configured to determine whether or not slippage of the belt has occurred based on rotation of the drive pulley and rotation of the driven pulley, the output state determination unit (44) configured to determine the output state of the sensor (40) that acquires the signal corresponding to the rotation of the driven pulley, and the speed of rotation limitation unit (46) configured to limit the speed of rotation of the drive source (12) that drives rotation of the drive pulley, wherein, when slippage of the belt is detected by the belt slippage determination unit, the speed of rotation limitation unit controls the upper limit of the speed of rotation of the drive source, on the basis of the determination made by the output state determination unit of the output state of the sensor. In accordance with such a configuration, since the upper limit of the speed of rotation of the drive source is controlled on the basis of the output state of the sensor, it is possible to prevent a situation in which traveling of the vehicle is significantly limited merely due to the occurrence of a failure such as a disconnection in the output of the sensor or the like.

The output state determination unit may determine that there is an output from the sensor based on an output which is greater than or equal to a predetermined level being obtained from the sensor. In accordance with such a configuration, it is possible to improve the reliability of the determination as to the presence or absence of an output from the sensor.

The vehicle control device may further comprise the generated heat determination unit (48) configured to determine whether or not a cumulative amount of generated heat due to slippage of the belt is greater than or equal to the cumulative amount of generated heat threshold value, wherein, in the case it is detected by the belt slippage determination unit that slippage of the belt has occurred, and it is determined by the output state determination unit that there is no output from the sensor, the speed of rotation limitation unit may limit the upper limit of the speed of rotation of the drive source to the first speed of rotation, and in the case it is detected by the belt slippage determination unit that slippage of the belt has occurred, it is determined by the output state determination unit that there is an output from the sensor, and it is determined by the generated heat determination unit that the cumulative amount of generated heat is greater than or equal to the cumulative amount of generated heat threshold value, the speed of rotation limitation unit may limit the upper limit of the speed of rotation of the drive source to the second speed of rotation, which is smaller than the first speed of rotation. In accordance with such a configuration, in the case that the generated heat determination unit determines that the cumulative amount of generated heat is greater than or equal to the cumulative amount of generated heat threshold value, since the upper limit of the speed of rotation of the drive source is limited to the comparatively small second speed of rotation, it is possible to reliably prevent breakage of the belt from occurring.

In the case it is detected by the belt slippage determination unit that slippage of the belt has occurred, it is determined by the output state determination unit that there is an output from the sensor, and it is determined by the generated heat determination unit that the cumulative amount of generated heat is less than the cumulative amount of generated heat threshold value, the speed of rotation limitation unit may limit the upper limit of the speed of rotation of the drive source to the first speed of rotation. In accordance with such a configuration, in the case that the generated heat determination unit determines that the cumulative amount of generated heat is less than the cumulative amount of generated heat threshold value, the upper limit of the speed of rotation of the drive source is limited to the first speed of rotation, which is comparatively large. Therefore, in accordance with such a configuration, at a stage at which the possibility of breakage of the belt is low, it is possible to prevent the traveling performance of a vehicle from being excessively limited.

The belt slippage determination unit may detect the slippage of the belt, on the basis of whether the ratio of the speed of rotation of the drive pulley to the speed of rotation of the driven pulley is greater than or equal to a threshold value. In accordance with such a configuration, slippage of the belt can be detected with a simple configuration.

The drive pulley may comprise the first fixed sheave (28a), and the first movable sheave (28b) that is movable in the axial direction, the driven pulley may comprise the second fixed sheave (30a), and the second movable sheave (30b) that is movable in the axial direction, and the continuously variable transmission may be configured in a manner so that the gear ratio becomes maximum in a state in which the first movable sheave does not contact the wall member (28cw) constituting part of the hydraulic actuator (28c) provided in the drive pulley.

The sensor may detect the rotation of the gear (26b) that is driven by the driven pulley.

The vehicle comprises the vehicle control device as described above.

The vehicle control method is a method of controlling the vehicle which is equipped with the continuously variable transmission, the transmission including the drive pulley, the driven pulley, and the belt that is entrained around the drive pulley and the driven pulley, the vehicle control method comprising the step (step S1) of detecting slippage of the belt based on rotation of the drive pulley and rotation of the driven pulley, the step (step S2) of determining the output state of the sensor configured to acquire the signal corresponding to the rotation of the driven pulley, and the step (step S4, step S5) of controlling the upper limit of the speed of rotation of the drive source that drives rotation of the drive pulley, on the basis of the output state of the sensor when slippage of the belt is detected.

The vehicle control method further comprises the step (step S3) of determining whether or not the cumulative amount of generated heat due to slippage of the belt is greater than or equal to the cumulative amount of generated heat threshold value, wherein, in the case that slippage of the belt is detected, and it is determined that there is no output from the sensor, by the step of controlling the upper limit of the speed of rotation of the drive source, the upper limit of the speed of rotation of the drive source is limited to the first speed of rotation (step S5), and in the case that slippage of the belt is detected, it is determined that there is an output from the sensor, and it is determined that the cumulative amount of generated heat is greater than or equal to the cumulative amount of generated heat threshold value, by the step of controlling the upper limit of the speed of rotation of the drive source, the upper limit of the speed of rotation of the drive source is limited to the second speed of rotation, which is smaller than the first speed of rotation (step S4).

What is claimed is:

1. A vehicle control device that controls a vehicle equipped with a continuously variable transmission, the transmission including a drive pulley, a driven pulley, and a belt that is entrained around the drive pulley and the driven pulley, the vehicle control device comprising:
   a belt slippage determination unit configured to determine whether or not slippage of the belt has occurred based on rotation of the drive pulley and rotation of the driven pulley;
   an output state determination unit configured to determine an output state of a sensor that acquires a signal corresponding to the rotation of the driven pulley; and
   a speed of rotation limitation unit configured to limit a speed of rotation of a drive source that drives rotation of the drive pulley;
   wherein, when slippage of the belt is detected by the belt slippage determination unit, the speed of rotation limitation unit controls an upper limit of the speed of rotation of the drive source, on a basis of a determination made by the output state determination unit of the output state of the sensor.

2. The vehicle control device according to claim 1, wherein the output state determination unit determines that there is an output from the sensor based on an output which is greater than or equal to a predetermined level being obtained from the sensor.

3. The vehicle control device according to claim 1, further comprising:
   a generated heat determination unit configured to determine whether or not a cumulative amount of generated heat due to slippage of the belt is greater than or equal to a cumulative amount of generated heat threshold value;
   wherein, in a case it is detected by the belt slippage determination unit that slippage of the belt has occurred, and it is determined by the output state determination unit that there is no output from the sensor, the speed of rotation limitation unit limits the upper limit of the speed of rotation of the drive source to a first speed of rotation; and
   in a case it is detected by the belt slippage determination unit that slippage of the belt has occurred, it is determined by the output state determination unit that there is an output from the sensor, and it is determined by the generated heat determination unit that the cumulative amount of generated heat is greater than or equal to a cumulative amount of generated heat threshold value, the speed of rotation limitation unit limits the upper limit of the speed of rotation of the drive source to a second speed of rotation, which is smaller than the first speed of rotation.

4. The vehicle control device according to claim 3, wherein, in a case it is detected by the belt slippage determination unit that slippage of the belt has occurred, it is determined by the output state determination unit that there is an output from the sensor, and it is determined by the generated heat determination unit that the cumulative amount of generated heat is less than the cumulative amount of generated heat threshold value, the speed of rotation limitation unit limits the upper limit of the speed of rotation of the drive source to the first speed of rotation.

5. The vehicle control device according to claim 1, wherein the belt slippage determination unit detects the slippage of the belt, on a basis of whether a ratio of the speed of rotation of the drive pulley to the speed of rotation of the driven pulley is greater than or equal to a threshold value.

6. The vehicle control device according to claim 1, wherein:
   the drive pulley comprises a first fixed sheave, and a first movable sheave that is movable in an axial direction;
   the driven pulley comprises a second fixed sheave, and a second movable sheave that is movable in the axial direction; and
   the continuously variable transmission is configured in a manner so that a gear ratio becomes maximum in a state in which the first movable sheave does not contact a wall member constituting part of a hydraulic actuator provided in the drive pulley.

7. The vehicle control device according to claim 1, wherein the sensor detects rotation of a gear that is driven by the driven pulley.

8. A vehicle comprising a vehicle control device, the vehicle control device controlling the vehicle equipped with a continuously variable transmission, the transmission including a drive pulley, a driven pulley, and a belt that is entrained around the drive pulley and the driven pulley, the vehicle control device comprising:
   a belt slippage determination unit configured to determine whether or not slippage of the belt has occurred based on rotation of the drive pulley and rotation of the driven pulley;
   an output state determination unit configured to determine an output state of a sensor that acquires a signal corresponding to the rotation of the driven pulley; and
   a speed of rotation limitation unit configured to limit a speed of rotation of a drive source that drives rotation of the drive pulley;
   wherein, when slippage of the belt is detected by the belt slippage determination unit, the speed of rotation limitation unit controls an upper limit of the speed of rotation of the drive source, on a basis of a determination made by the output state determination unit of the output state of the sensor.

9. A vehicle control method for controlling a vehicle equipped with a continuously variable transmission, the transmission including a drive pulley, a driven pulley, and a belt that is entrained around the drive pulley and the driven pulley, the vehicle control method comprising:

a step of detecting slippage of the belt based on rotation of the drive pulley and rotation of the driven pulley;

a step of determining an output state of a sensor configured to acquire a signal corresponding to the rotation of the driven pulley; and a step of controlling an upper limit of the speed of rotation of a drive source that drives rotation of the drive pulley, on a basis of the output state of the sensor when slippage of the belt is detected.

10. The vehicle control method according to claim 9, further comprising:

a step of determining whether or not a cumulative amount of generated heat due to slippage of the belt is greater than or equal to a cumulative amount of generated heat threshold value;

wherein, in a case that slippage of the belt is detected, and it is determined that there is no output from the sensor, by the step of controlling the upper limit of the speed of rotation of the drive source, the upper limit of the speed of rotation of the drive source is limited to a first speed of rotation; and in a case that slippage of the belt is detected, it is determined that there is an output from the sensor, and it is determined that the cumulative amount of generated heat is greater than or equal to the cumulative amount of generated heat threshold value, by the step of controlling the upper limit of the speed of rotation of the drive source, the upper limit of the speed of rotation of the drive source is limited to a second speed of rotation, which is smaller than the first speed of rotation.

* * * * *